No. 846,287. PATENTED MAR. 5, 1907.
H. DELLE.
BRUSH.
APPLICATION FILED OCT. 13, 1906.

Witnesses
Frank Hough
F. S. Elmore

Inventor
Harry Delle,
By Victor J. Evans
Attorney

UNITED STATES PATENT OFFICE.

HARRY DELLE, OF CINCINNATI, OHIO.

BRUSH.

No. 846,287. Specification of Letters Patent. Patented March 5, 1907.

Application filed October 13, 1906. Serial No. 338,825.

*To all whom it may concern:*

Be it known that I, HARRY DELLE, a citizen of the United States, residing at Cincinnati, in the county of Hamilton and State of Ohio, have invented new and useful Improvements in Brushes, of which the following is a specification.

This invention relates to brushes designed especially for use in cleaning lathe-centers, and embodies in its organization a tubular handle or sleeve having a brush-carrying member or shank rotatively mounted therein.

The invention has for its objects to provide a comparatively simple inexpensive device of this character which will effectually clean and polish the lathe-center, one wherein the tool-shank may be readily reciprocated within the handle, and one in which the shank will be automatically rotated during its reciprocation.

With these and other objects in view the invention comprises the novel features of construction and combination of parts more fully hereinafter described.

Figure 1:
Figure 2:
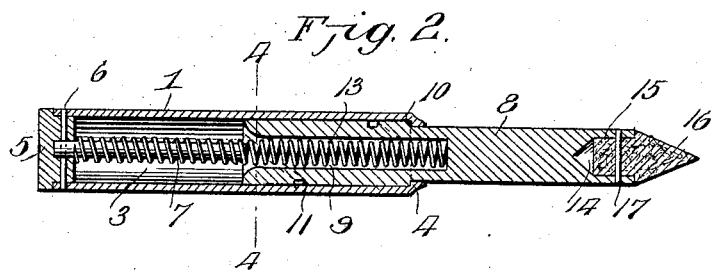
Figure 3:
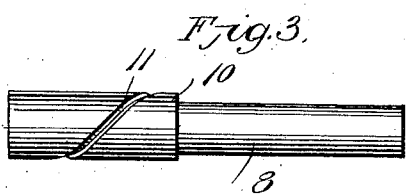
Figure 4:
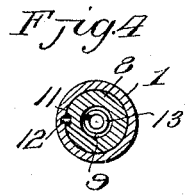

In the accompanying drawings, Figure 1 is a side elevation of a device embodying the invention. Fig. 2 is a sectional view taken centrally and longitudinally through the tool. Fig. 3 is a detail view of the brush-carrying member. Fig. 4 is a cross-section taken on the line 4 4 of Fig. 2.

Referring to the drawings, it will be seen that the device comprises a cylindrical tubular handle portion or sleeve 1, having its outer face roughened, as at 2, and presenting an internal elongated chamber or bore 3, reduced at its forward end to form a stop-shoulder 4 and closed at its rear end by means of a cap 5, fixed in place through the medium of a transverse connecting-pin 6, there being secured to the cap by means of the pin 6 a forwardly-projecting guide-rod 7, extended centrally and longitudinally of the chamber 3.

Slidably and telescopically arranged within the handle 1 is a brush-carrying member or plunger 8, having a reduced forward portion, which normally projects beyond the forward end of the handle, and an enlarged rear portion, which fits within the handle and has a central longitudinal opening or bore 9 formed to receive the guide-rod 7, there being formed around the enlarged rear portion of the plunger, which is provided adjacent its longitudinal center with a stop-shoulder 10, a spiral groove 11, into which is projected a pin or stud 12, fixed to and projecting from the inner wall of the handle 1, while coiled throughout a portion of its length on the guide-rod 7 is a normally expanded pressure-spring 13, which extends into the bore 9 and serves to normally project the forward portion of the plunger 8 beyond the handle 1.

Formed at the outer end of the plunger is a socket 14, in which is fitted the shank portion 15 of a conical polishing-brush 16, attached to the plunger by means of a pin 17, extended transversely through the shank portion 15 and adjacent walls of the socket 14.

In practice and in order to clean and polish the lathe-center, the pointed end of the brush 16 is seated therein and the handle 1 moved forwardly on the plunger 8 against the action of the spring 13, whereby the pin 12, traveling in the spiral groove 11, will impart to the plunger 8 a rotary motion in one direction, it being apparent that during the return movement of the handle under the action of the spring 13 the pin will act in the groove 11 for reversely rotating the plunger. It will be noted that under this construction the brush-carrying member 8 is automatically rotated during the relative longitudinal movement of the plunger and handle and that the direction of rotation of the member is successively reversed, thus insuring a rapid and effectual cleaning and polishing of the lathe-center.

Having thus described my invention, what I claim is—

A device of the class described comprising a tubular handle, a forwardly-projecting guide-rod attached to the rear wall of the handle and disposed centrally and longitudinally of the latter, a plunger slidably and telescopically arranged in the handle and having a central longitudinal bore to receive said guide-rod, said handle and plunger being provided with interengaging stop-shoulders for limiting the outward movement of the plunger, a polishing-head carried at the outer end of the latter, means for rotating the plunger during relative reciprocation of the stem and handle, and an expanded spring coiled upon the guide-rod and arranged to bear on the plunger for normally projecting the same beyond the handle.

In testimony whereof I affix my signature in presence of two witnesses.

HARRY DELLE.

Witnesses:
   HENRY L. KLANK,
   NICKOLAUS KIRCHHEINER.